United States Patent
Koh (10) Patent No.: US 9,374,520 B2
(45) Date of Patent: Jun. 21, 2016

(54) DIGITAL IMAGE PROCESSING APPARATUS AND METHOD OF CONTROLLING THE SAME

(71) Applicant: SAMSUNG ELECTRONICS CO., LTD., Suwon-si, Gyeonggi-do (KR)

(72) Inventor: Sung-shik Koh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/734,663

(22) Filed: Jun. 9, 2015

(65) Prior Publication Data

US 2015/0271387 A1    Sep. 24, 2015

Related U.S. Application Data

(63) Continuation of application No. 13/658,298, filed on Oct. 23, 2012, now Pat. No. 9,094,599, which is a continuation of application No. 12/231,780, filed on Sep. 5, 2008, now Pat. No. 8,300,135.

(30) Foreign Application Priority Data

Feb. 4, 2008    (KR) .................. 10-2008-0011064

(51) Int. Cl.
| | | |
|---|---|---|
| *G02B 13/16* | (2006.01) | |
| *H04N 5/225* | (2006.01) | |
| *H04N 5/232* | (2006.01) | |

(52) U.S. Cl.
CPC ....... *H04N 5/23212* (2013.01); *H04N 5/23216* (2013.01); *H04N 5/23293* (2013.01)

(58) Field of Classification Search
CPC .............. H04N 5/232; H04N 5/23212; H04N 5/23216; H04N 5/23293
USPC .......... 348/335, 340, 345, 348, 349, 350, 352
See application file for complete search history.

(56) References Cited

U.S. PATENT DOCUMENTS

| 7,136,581 | B2 | 11/2006 | Fujii | |
|---|---|---|---|---|
| 2005/0031325 | A1* | 2/2005 | Fujii | ................. H04N 5/23212 396/54 |

(Continued)

FOREIGN PATENT DOCUMENTS

| CN | 1716083 A | 1/2006 |
|---|---|---|
| CN | 101065956 A | 10/2007 |

(Continued)

OTHER PUBLICATIONS

Office Action issued for CN200810168600.3 (May 16, 2012).

(Continued)

*Primary Examiner* — Yogesh Aggarwal
(74) *Attorney, Agent, or Firm* — Drinker Biddle & Reath LLP (57) ABSTRACT

A digital image processing apparatus and a method of controlling the same. When the composition of a subject displayed on a display of the apparatus is changed during application of a first shutter-release signal, a current auto-focus (AF) region moves along with the subject and displayed on the display at the same time as the subject. The apparatus can further display an initial AF region on the display in a manner distinguishable from the current AF region. After the composition of the subject is changed, while the current AF region moving along with the subject is being displayed on the display, when the application of the first shutter-release signal is interrupted, an AF region is reset as the initial AF region. Also, an image file can be generated and stored after application of a second-shutter release signal which occurs after application of the first shutter-release signal.

15 Claims, 7 Drawing Sheets

(56) References Cited

U.S. PATENT DOCUMENTS

| | | |
|---|---|---|
| 2006/0001763 A1 | 1/2006 | Takemoto |
| 2008/0002048 A1 | 1/2008 | Ito et al. |
| 2008/0079837 A1 | 4/2008 | Masubuchi |
| 2013/0002922 A1* | 1/2013 | Miyata .................. H04N 5/232 348/333.01 |

FOREIGN PATENT DOCUMENTS

| | | |
|---|---|---|
| CN | 101098405 A | 1/2008 |
| JP | 05-080248 A | 4/1993 |
| JP | 2001-350085 A | 12/2001 |
| JP | 2005-055744 A | 3/2005 |
| JP | 2006-317959 A | 11/2006 |
| KR | 10-2008-0002667 A | 1/2008 |

OTHER PUBLICATIONS

Office Action issued for CN 201310017868.8 (Apr. 24, 2015).
Office Action issued for KR 10-2008-0011064 (Jan. 21, 2014).
Notice of Allowance issued for KR 10-2008-0011064 (Jul. 30, 2014).
Notice of Allowance issued for KR 10-2014-0047605 (Jul. 30, 2014).

* cited by examiner

DIGITAL IMAGE PROCESSING APPARATUS AND METHOD OF CONTROLLING THE SAME

CROSS-REFERENCE TO RELATED PATENT APPLICATIONS

This application is a continuation of U.S. patent application Ser. No. 13/658,298, filed Oct. 23, 2012, which is a continuation application of and claims the priority benefit of U.S. patent application Ser. No. 12/231,780, filed on Sep. 5, 2008, now U.S. Pat. No. 8,300,135, and also claims the priority benefit of Korean Patent Application No. 10-2008-0011064, filed on Feb. 4, 2008, in the Korean Intellectual Property Office, the entire contents of all of which is incorporated herein by reference.

BACKGROUND

1. Field

The present invention relates to a digital image processing apparatus and a method of controlling the same. More particularly, the present invention relates to a digital image processing apparatus and method in which the current AF region is displayed on a display unit if the composition of a subject is changed with application of a first shutter-release signal, while a current auto-focus (AF) region is moving along with the subject.

2. Description of the Related Art

In general, digital image processing apparatuses process images of digital cameras, personal digital assistants (PDAs), phone cameras, and personal computer (PC) cameras or employ motion recognition sensors. A digital image processing apparatus may receive a desired image via a photographing device, display the received image on an image display device, store the image as an image file by selection of a user, and print the stored image file.

Figure 1A:
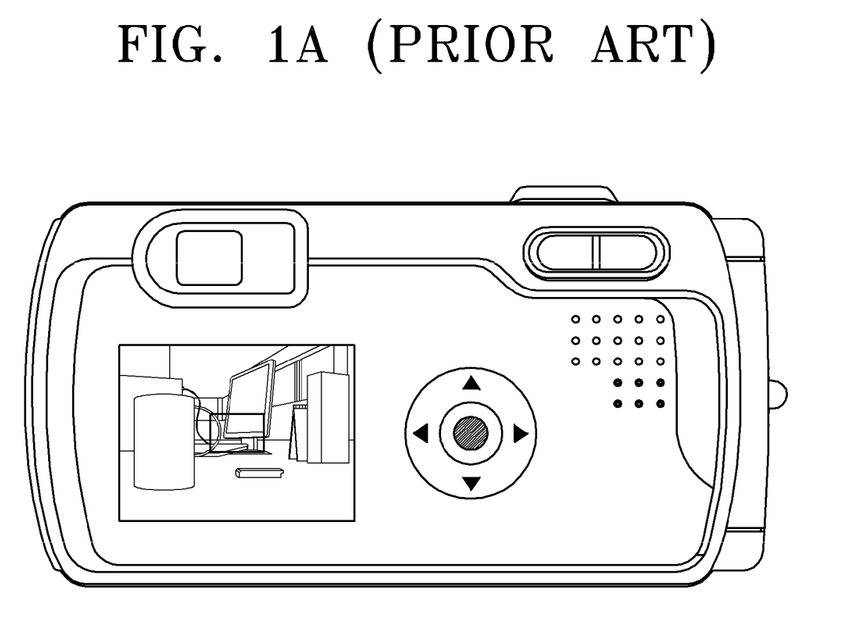
FIGS. 1A through 1C are bottom views of an example of a digital image processing apparatus for explaining conventional methods of selecting regions.
Figure 1B:
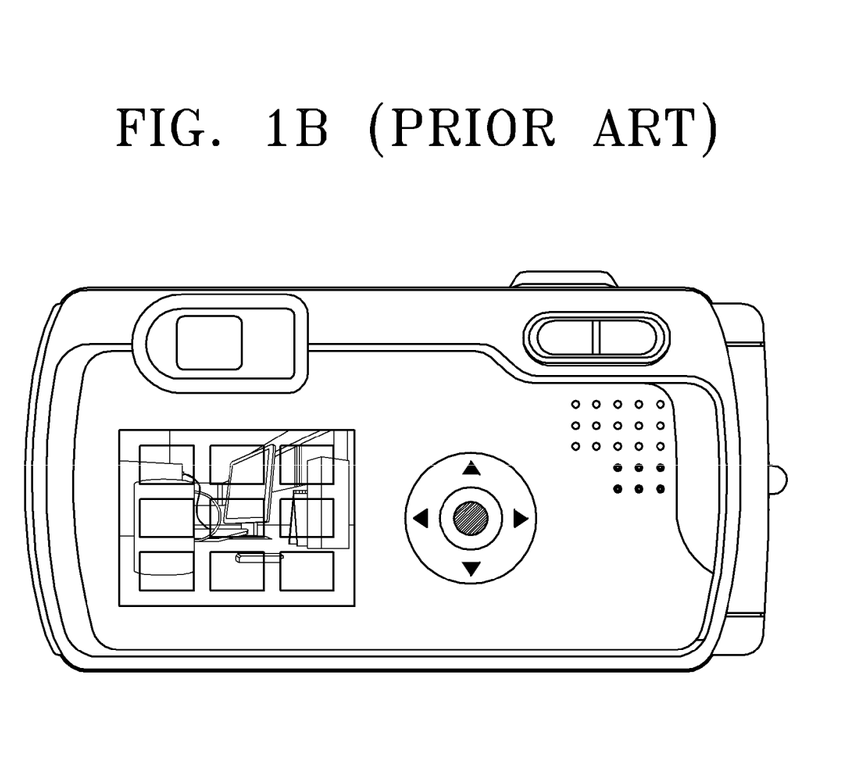

The digital image processing apparatus extracts data required for auto focus (AF) from a predetermined region in order to enable an AF function. In this case, selection of a region is limited as shown in FIGS. 1A and 1B. Specifically, a previously determined region may be selected or center AF or multi-AF may be selected. Also, before photographing an image, a complicated process including selecting a menu, selecting a region selection menu, and selecting a region is performed.

FIG. 1A is a bottom view of an example of a digital camera for explaining a center AF method. In the center AF method, a screen is divided into a plurality of fixed regions, a predetermined region is selected from the fixed regions, AF processing is performed on the selected region, and photographing occurs.

FIG. 1B is a bottom view of an example of a digital camera for explaining a multi-AF method. In the multi-AF method, a screen is divided into a plurality of fixed regions, AF processing is performed on the respective fixed regions, and photographing occurs.

Figure 1C:
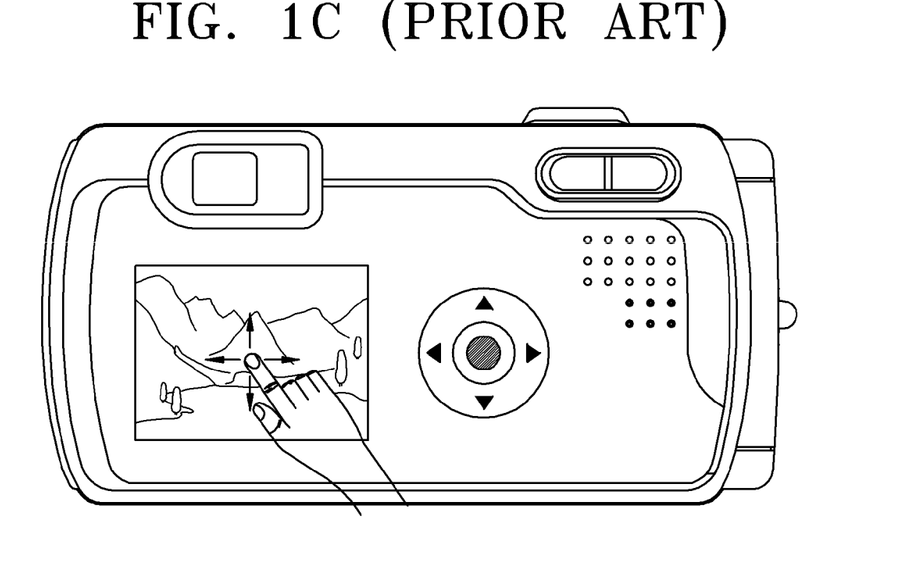

Since the methods used in the digital cameras shown in FIGS. 1A and 1B are complicated, when a user adjusts the focus centering on selection of a region, after the focus is adjusted by pressing an AF lock button, the digital camera is moved to a desired region to adjust the focus and then moved to obtain a desired composition before photographing begins. Also, when AF is performed using a touch pad as shown in FIG. 1C, it is convenient for photographers, but a liquid crystal display (LCD) for the touch pad is necessarily required.

As described above, a conventional digital image processing apparatus is limited in selecting an AF region. Also, the digital image processing apparatus moves from a predetermined region to another region only by operating a button, so that it is difficult to set the AF region.

SUMMARY

The present invention provides a digital image processing apparatus and method in which the current AF region is displayed on a display unit if the composition of a subject is changed with application of a first shutter-release signal, while a current auto-focus (AF) region is moving along with the subject, so that a user can easily set a desired AF region.

According to an aspect of the present invention, there is provided a digital image processing apparatus having a display unit. The apparatus includes a digital signal processing unit for controlling the digital image processing apparatus such that after the composition of a subject is changed during application of a first shutter-release signal, a current AF region moves along with the subject and is displayed on the display unit at the same time.

An initial AF region may be further displayed on the display unit. Before the composition of the subject is changed, the composition of the subject may be set such that the subject is located within the initial AF region. While the composition of the subject is being changed and the current AF region moving along with the subject is being displayed on the display unit, the digital signal processing unit may control the digital image processing apparatus such that the initial AF region remains displayed on the display unit.

The digital signal processing unit may control the digital image processing apparatus such that the current AF region and the initial AF region are distinguishingly displayed on the display unit. The current AF region and the initial AF region may be distinguishingly displayed by varying at least one of color, shape, and thickness of a region division line. After the composition of the subject is changed, while the current AF region moving along with the subject is being displayed on the display unit, when the application of the first shutter-release signal is interrupted, the digital signal processing unit may reset an AF region as the initial AF region.

Another embodiment of the present invention provides a method of controlling a digital image processing apparatus comprising a display unit. The method includes setting the composition of a subject such that the subject is disposed in an initial auto-focus (AF) region, inputting a first shutter-release signal; changing the composition of the subject during the application of the first shutter-release signal, moving a current AF region along with the subject and displaying the current AF region on the display unit at the same time, inputting a second shutter-release signal, and generating and storing an image file.

During the changing of the composition of the subject during the application of the first shutter-release signal and during the moving of the current AF region along with the subject and the displaying of the current AF region on the display unit at the same time, the initial AF region may remain displayed on the display unit. The current AF region and the initial AF region may be distinguishingly displayed on the display unit.

The current AF region and the initial AF region may be distinguishingly displayed by varying at least one of color, shape, and thickness of a region division line. During the changing of the composition of the subject during the application of the first shutter-release signal and during the moving of the current AF region along with the subject and the displaying of the current AF region on the display unit at the same time, when the application of the first shutter-release signal is interrupted, an AF region may be reset as the initial AF region. Moving the current AF region along with the subject and displaying the current AF region on the display unit at the same time may include moving the current AF region along with the subject and displaying a moving path of the current AF region on the display unit in real-time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 2:
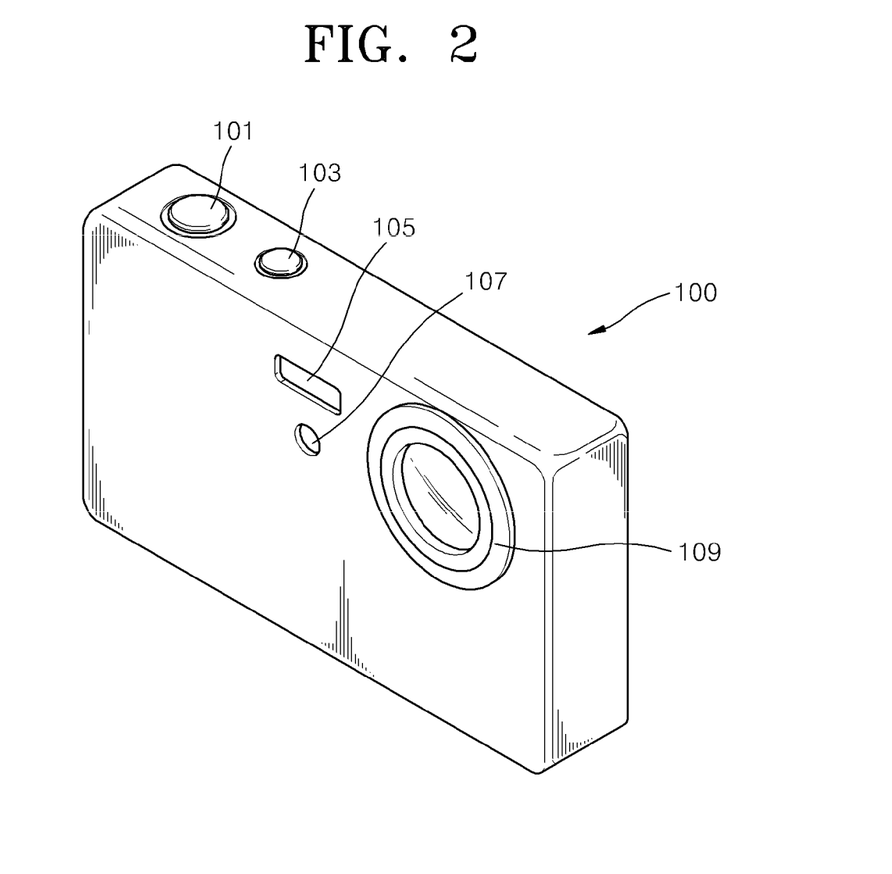
FIG. 2 is a perspective view of a front side and a top side of an example of a digital image processing apparatus according to an embodiment of the present invention.

FIG. 2 is a perspective view of a front side and a top side of an example of a digital image processing apparatus according to an embodiment of the present invention.

Referring to FIG. 2, the digital image processing apparatus includes a shutter-release button 101, a power button 103, a flash 105, a sub-light 107, and a lens 109. When the power button 103 is pressed, power is supplied to the digital image processing apparatus so that the digital image processing apparatus can operate. In this state, when the shutter-release button 101 is pressed, a charge-coupled device (CCD) or a film is exposed to light for a predetermined time via an iris diaphragm (not shown) and the lens 109 so that an image of a subject to be photographed is recorded in the CCD.

When the shutter-release button 101 is pressed by a user, first and second image photographing signals are generated. When the shutter-release button 101 is half-pressed, the digital image processing apparatus adjusts the focus and controls the amount of light entering the lens 109. When the focus is properly adjusted, a green light lights up on a display unit (refer to 113 in FIG. 3). After the focus is adjusted and the amount of light is controlled by half-pressing the shutter-release button 101, the shutter-release button 101 is fully pressed to photograph the subject.

The flash 105 is used to instantaneously or substantially instantaneously illuminate the subject when photographing takes place in a dark place. Flash modes include an automatic mode, a forced flash mode, a flash-off mode, a red-eye reduction mode, and a slow-sync flash mode.

The sub-light 107 supplies light to the subject such that in the case of a lack of light or night photography, the digital image processing apparatus can automatically adjusts the focus in a rapid and accurate way. The lens 109 receives light bouncing off the subject and processes an image of the subject.

Figure 3:
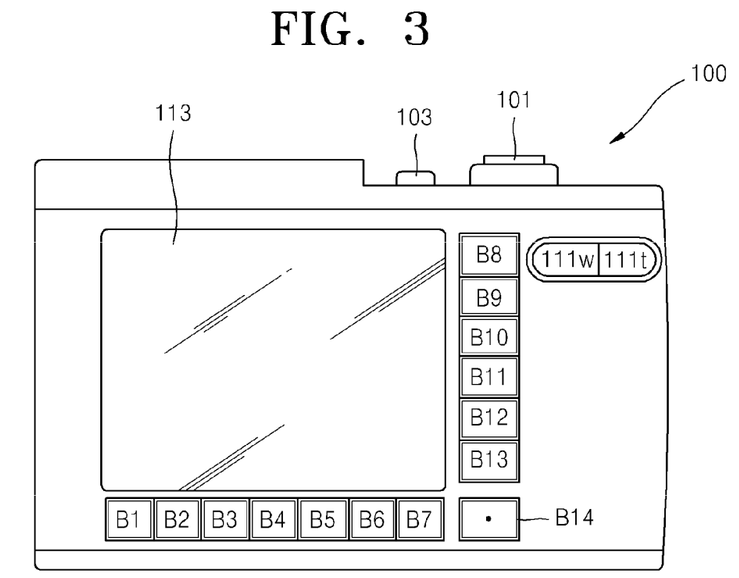
FIG. 3 is a bottom view of the digital image processing apparatus shown in FIG. 2.

FIG. 3 is a view of a back side of the digital image processing apparatus shown in FIG. 2.

Referring to FIG. 3, the digital image processing apparatus further includes a wide-angle zoom button 111w, a telephoto zoom button 111t, the display unit 113, and input buttons B1 to B14 (hereinafter, referred to as 'buttons B1 to B14'), wherein each button may include a touch sensor (not shown) or a contact switch (not shown).

The wide-angle zoom button 111w or the telephoto zoom button 111t is pressed to respectively increase or decrease an angle of view, thereby changing the size of a selected region to be photographed. When the wide-angle zoom button 111w is pressed, the size of the selected region is reduced. When the telephoto zoom button 111t is pressed, the size of the selected region is enlarged.

The buttons B1 to B14 are arranged in a column and a row beside the display unit 113. Each of the buttons B1 to B14 arranged along the lateral and bottom sides of the display unit 113 includes the touch sensor or the contact switch. If each of the buttons B1 to B14 includes a touch sensor, each of the buttons B1 to B17 arranged in a row or each of the buttons B8 to B14 arranged in a column is touched and moved upward, downward, to the left, or to the right, so that an arbitrary value (e.g., color or brightness) may be selected out of main menu icons or one of sub-menu icons included in the main menu icons may be enabled. If each of the buttons B1 to B14 includes a contact switch, a main menu icon and a sub-menu icon can be directly selected to perform a desired function. When touch sensors are used, the operating force is smaller than the operating force for contact switches, and the contact switch needs to be touched more strongly than the touch sensor.

Figure 4:
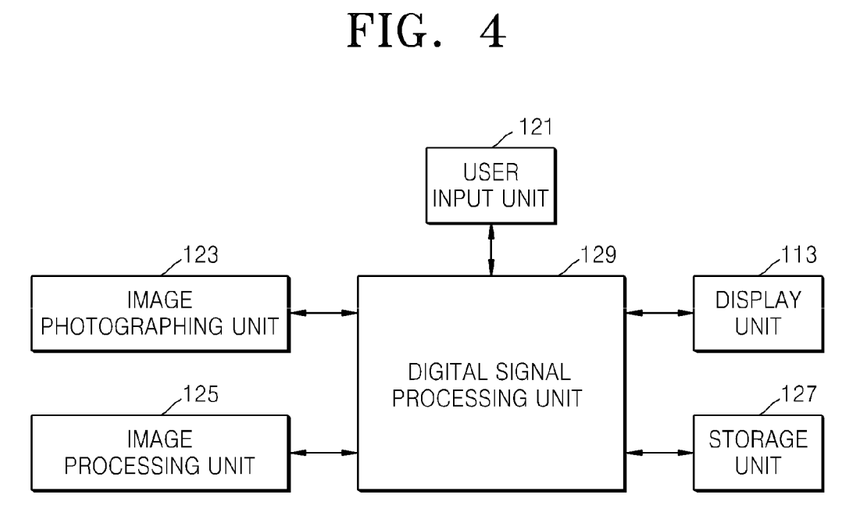
FIG. 4 is a block diagram of the digital image processing apparatus shown in FIGS. 2 and 3.

FIG. 4 is an exemplary block diagram of the digital image processing apparatus shown in FIGS. 2 and 3.

Referring to FIG. 4, the digital image processing apparatus includes the display unit 113, a user input unit 121, an image photographing unit 123, an image processing unit 125, a storage unit 127, and a digital signal processing unit 129. The user input unit 121 includes the shutter release button 101, the power button 103, the wide-angle zoom button 111w and the telephoto zoom button 111t, and buttons B1 to B14. The shutter-release button 101 is operated to expose a CCD to light for a predetermined time. The power button 103 is pressed to supply power to the digital image processing apparatus. The wide-angle zoom button 111w or the telephoto zoom button 111t is pressed to increase or decrease an angle of view. The buttons B1 to B14 are arranged in a row and a column beside the display unit 113. Each of the buttons B1 to B14 may include a touch sensor (not shown) or a contact switch (not shown).

The image photographing unit 123 includes a shutter, a lens, an iris diaphragm, the CCD, and an analog-to-digital converter (ADC), although they are not shown. The shutter is a component that controls the amount of light entering the lens and the iris diaphragm. The lens receives light bouncing off a subject to be photographed and processes an image of the subject. In this case, the amount of light is controlled according to an opening extent of the iris diaphragm, which is regulated by the digital signal processing unit 129.

The CCD accumulates light received via the lens and outputs an image on the display unit 113 according to the amount of accumulated light in response to a vertical synchronizing signal. The CCD converts light reflected by a subject to be photographed into an electric signal. In order to obtain a color image using the CCD, a color filter is included in the digital image processing apparatus of the present invention. The color filter may be a color filter array (CFA). The CFA includes regularly arranged pixels, each pixel allowing only single-color light to pass therethrough, and may have various shapes according to the type of arrangement of pixels. The ADC converts an analog image signal output from the CCD into a digital signal.

The image processing unit 125 processes raw digital data so as to display the data. The image processing unit 125 removes a black level caused by a dark current generated in the CCD and CFA, which are sensitive to temperature variations. The image processing unit 125 gamma encodes data in conformity with nonlinearity of a human's eyesight. The image processing unit 125 converts a Bayer pattern embodied by an RGRG line and a GBGB line of the gamma encoded data into an RGB line using CFA interpolation. The image processing unit 125 converts an interpolated RGB signal into a YUV signal, performs an edge compensation process of filtering a Y signal using a high pass filter (HPF) to process an image clearly, performs a color correction process of correcting color values of U and V signals using a normal color coordinate system, and eliminates noise from Y, U, and V signals. The image processing unit 125 compresses and processes the Y, U, and V signals, from which noise is eliminated, to generate a joint photographic coding experts group (JPEG) file, and the generated JPEG file is displayed on the display unit 113 and stored in the storage unit 127. The above-described operations of the image processing unit 125 are controlled by the digital signal processing unit 129. While a first shutter-release signal is being applied to the digital image processing apparatus, when the composition of a subject is changed, the digital signal processing unit 129 controls the digital image processing apparatus such that a current auto focus (AF) region moves along with the subject and is displayed on the display unit 113 at the same time.

Figure 5:
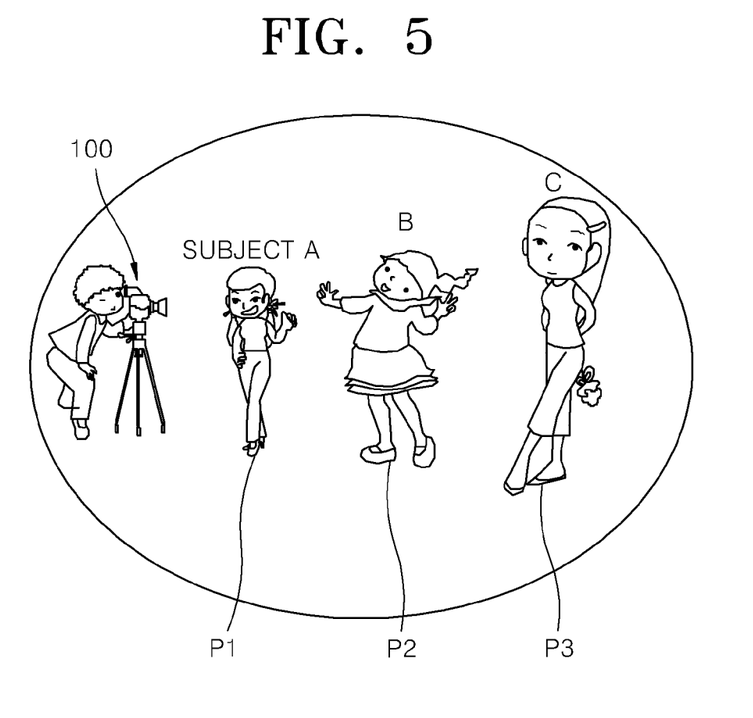
FIG. 5 is a diagram for explaining an example of an operation of photographing images using a digital image processing apparatus according to an embodiment of the present invention.

FIG. 5 is a diagram for explaining an operation of photographing images using a digital image processing apparatus 100 according to an embodiment of the present invention. In FIG. 5, a first subject P1, a second subject P2, and a third subject P3 are sequentially disposed on a front side of the digital image processing apparatus 100.

FIGS. 6A through 6E are diagrams for explaining an example of a process of photographing an image using a digital image processing apparatus 100 according to an exemplary embodiment of the present invention. In FIGS. 6A through 6E, it is exemplarily illustrated that although a user of the digital image processing apparatus 100 disposes the second subject P2 in the center of an image in order to photograph all the three subjects P1, P2, and P3 in the image, the user tries focusing the lens 109 on the first subject P1.

As will now be discussed in more detail, the digital image processing apparatus 100 operating in accordance with embodiments of the present invention may allow the user to easily set a desired region as the AF region. Specifically, an example of a method of controlling the digital image processing apparatus shown in FIG. 4 will be described with reference to FIG. 7. In this present embodiment, an algorithm for operating the digital image processing apparatus may be performed in the digital signal processing unit 129 by the aid of peripheral components.

Figure 7:
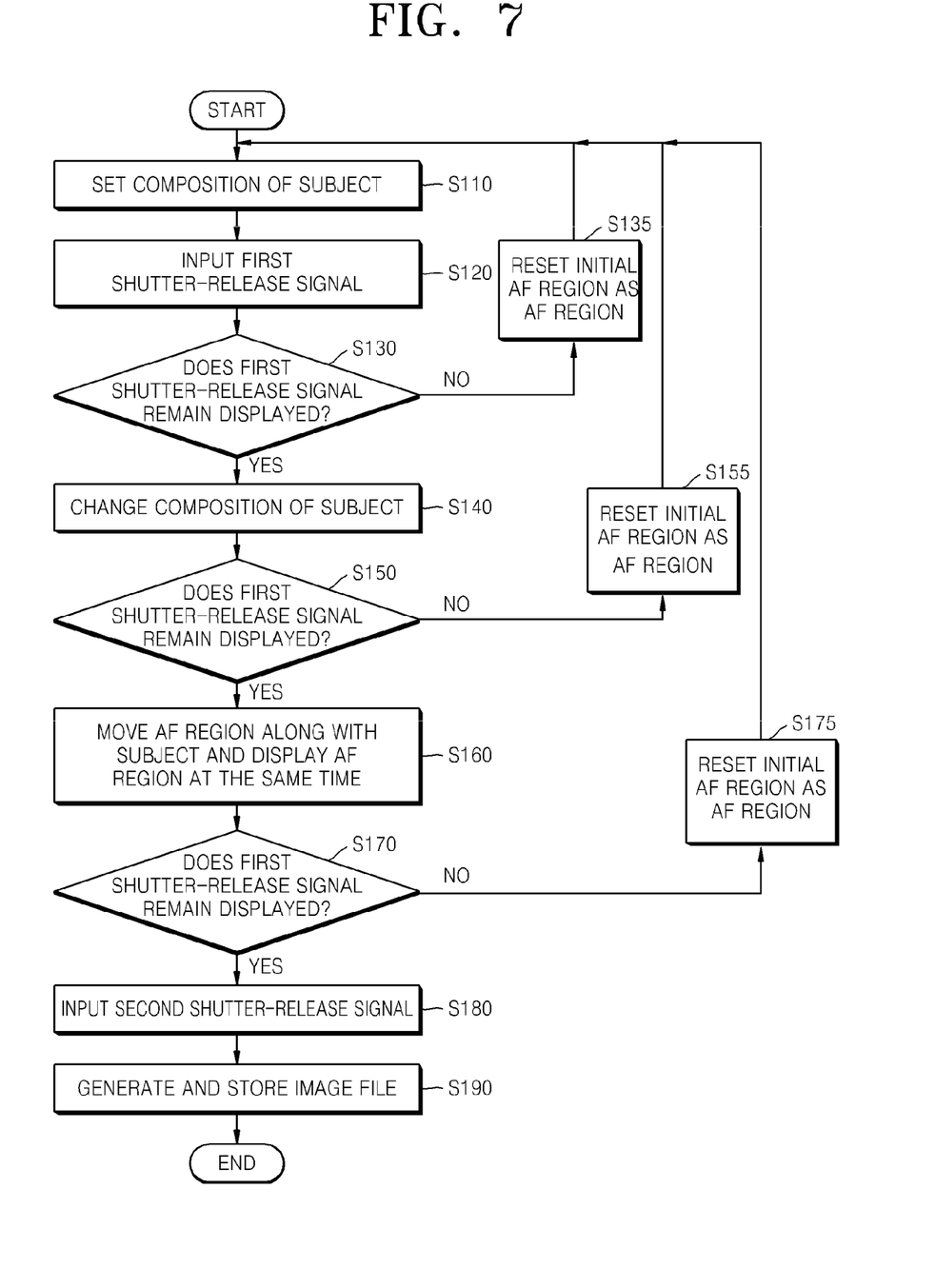
FIG. 7 is a flowchart illustrating an example of a method of controlling a digital image processing apparatus according to an exemplary embodiment of the present invention.

Referring to FIG. 7, the method of controlling the digital image processing apparatus shown in FIG. 4 includes setting the composition of a subject (operation S110), inputting a first shutter-release signal (operation S120), determining if the application of the first shutter-release signal is continued (operation S130), changing the composition of the subject (operation S140), determining if the application of the first shutter-release signal is continued (operation S150), moving a current AF region along with the subject and displaying the current AF region on a display unit at the same time (operation S160), determining if the application of a first shutter-release signal is continued (operation S170), inputting a second shutter-release signal (operation S180), and generating and storing an image file (operation S190).

To begin, the user sets the composition of the subject in operation S110. Specifically, while seeing a preview image displayed on the display unit 113, the user controls the position and size of the subject to be photographed in the image. In FIGS. 5 and 6, although the second subject P2 is disposed in the center of the image and photographed in order to photograph a single image containing all the three subjects P1, P2, and P3, the focus of the image is adjusted to the first subject P1.

In a conventional digital image processing apparatus, a user adjusts the focus centering on selection of a region. Thus, after the focus is adjusted by pressing an AF lock button, a digital camera is moved to a desired region to adjust the focus and then moved to obtain a desired composition before photographing begins. During this complicated process, an initial AF region located in the center of a display unit and a current AF region on which the user desires to focus a lens are not distinguishingly displayed. Thus, it is basically impossible to confirm where the current AF region is during the movement of the digital camera.

In order to solve the foregoing problems, in the digital image processing apparatus 100 according to the embodiment of the present invention, a subject on which the user desires to focus the lens 109 is disposed in the initial AF region AF1. Thereafter, while the first shutter-release signal is being applied, when the composition of the subject is changed by moving the digital image processing apparatus 100, the current AF region AF2 moves along with the subject and is displayed on the display unit 113 at the same time.

Figure 6A:
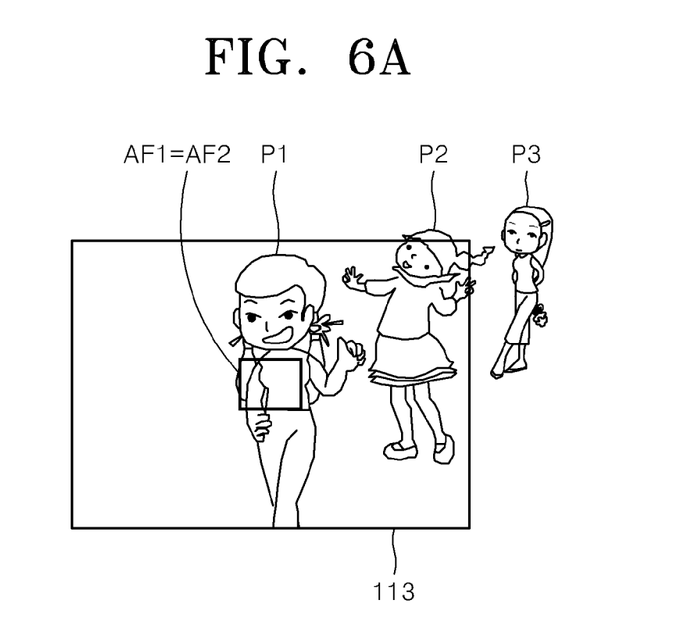
FIGS. 6A through 6E are diagrams for explaining an example of a process of photographing an image using a digital image processing apparatus according to an exemplary embodiment of the present invention.

Specifically, FIG. 6A illustrates that the composition of the subjects P1 to P3 is determined such that the first subject P1 is disposed in the initial AF region AF1. That is, when the user desires to dispose the second subject P2 in the center of an image and focus the lens 109 on the first subject P1, the composition of the image is determined such that the first subject P1 is disposed in the initial AF region AF1. In this state, the initial AF region AF1 corresponds to the current AF region AF2.

Although FIG. 6A illustrates that the initial AF region AF1 is set to the center of the display unit 113, the present invention is not limited to this arrangement. That is, the initial AF region AF1 may be set to various regions of the display unit 113 according to a user's selection or automatically.

Next, the user inputs the first shutter-release signal and changes the composition of the subjects P1 to P3 during the application of the first shutter-release signal. Thus, the current AF region AF2 moves along with the first subject P1 and is displayed on the display unit 113 at the same time.

Figure 6B:
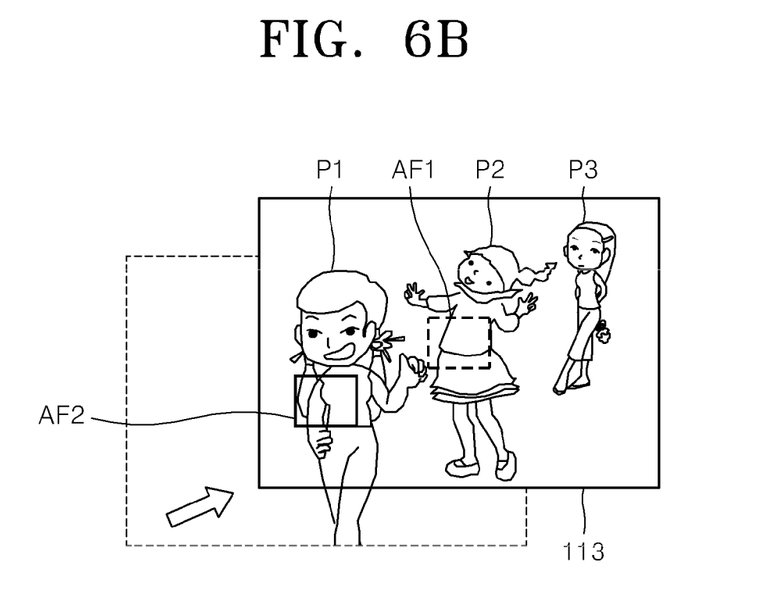
Figure 6C:
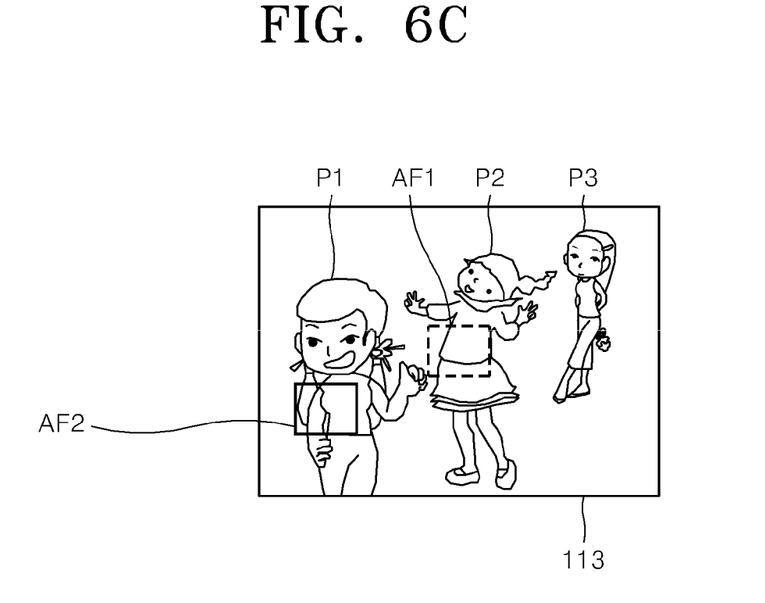

Specifically, FIG. 6B illustrates that the composition of the subjects P1 to P3 is changed during the application of the first shutter-release signal, and FIG. 6C illustrates that when the composition of the subjects P1 to P3 is changed, the current AF region AF2 moves along with the subject and is displayed on the display unit 113. During the application of the first shutter-release signal, the user moves the digital image processing apparatus 100 in the arrow direction to change the composition of the subjects P1 to P3 such that the second subject P2 is disposed in the center of the image.

As a result, as shown in FIGS. 6B and 6C, the current AF region AF2 moves along with the first subject P1, which is determined to be disposed in the initial AF region AF1, and is displayed on the display unit 113 at the same time during the application of the first shutter-release signal. While the composition of the subjects P1 to P3 is changed and the current AF region AF2 moving along with the first subject P1 is displayed on the display unit 113, the digital signal processing unit 129 may control the digital image processing apparatus 100 such that the initial AF region AF1 remains displayed on the display unit 113. In other words, the initial AF region AF1 that is determined directly before or when the first shutter-release signal is input remains displayed irrespective of the motion of the current AF region AF2. Obviously, the initial AF region AF1 displayed on the display unit 113 is not a region on which the lens 109 is actually focused but an AF region set as a default.

The digital image processing unit 129 may control the digital image processing apparatus 100 such that the current AF region AF2 and the initial AF region AF1 are distinguishingly displayed on the display unit 113. Specifically, as shown in FIGS. 6B and 6C, the initial AF region AF1 may be distinguished from the current AF region AF2 by varying at least one of the color, shape, and thickness of a region division line. In FIGS. 6B and 6C, the initial AF region AF1 is illustrated with a gray dotted line, and the current AF region AF2 is illustrated with a green solid line.

After the composition of the subject is changed during the application of the first shutter-release signal in operation S140, while the current AF region AF2 is moving along with the first subject P1 and being displayed on the display unit 113 at the same time in operation S160, the digital signal processing unit 129 continuously determines if the application of the first shutter-release signal is continued in operations S130, S150, and S170.

Figure 6D:
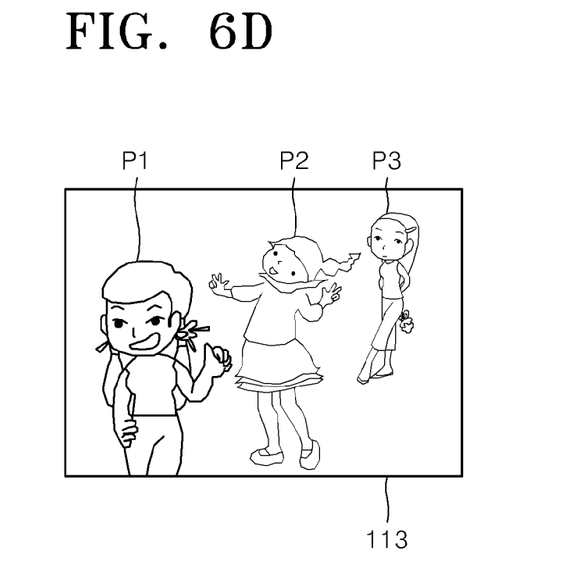
Figure 6E:
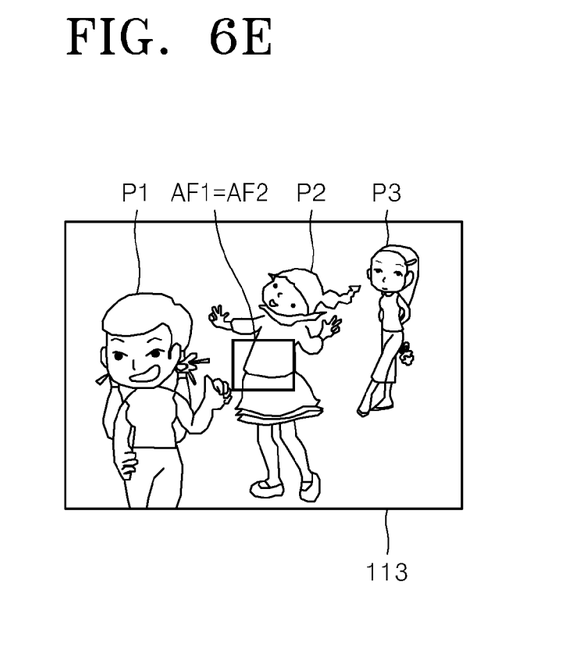

That is, referring to FIG. 6D, when the user inputs a second shutter-release signal, while the lens 109 is being focused on the first subject P1, an image in which the second subject P2 is disposed in the center may be photographed. However, after the composition of the subjects P1 to P3 is changed, while the current AF region AF2 moving along with the first subject P1 is displayed on the display unit 113, the application of the first shutter-release signal may be interrupted. In this case, the initial AF region AF1 is reset as an AF region. That is, when the application of the first shutter-release signal is interrupted, as shown in FIG. 6E, the initial AF region AF1 is reset as the AF region and becomes the current AF region AF2 again.

In other words, when it is determined that the application of the first shutter-release signal is interrupted, the initial AF region AF1 is reset as an AF region in operations S135, S155, and S175 shown in FIG. 7. When the application of the first shutter-release signal is interrupted, as shown in FIG. 6E, the initial AF region AF1 is reset as the AF region and becomes the current AF region AF2 again.

Finally, when the user sets a desired composition of the subject, the user inputs the second shutter-release signal in operation S180, and the digital signal processing unit 129 receives the second shutter-release signal and controls the image processing unit 125 to generate a photographed image as a JPEG image file, display the photographed image on the display unit 113, and store the JPEG image file in the storage unit 127 in operation S190.

Accordingly, as can be appreciated from the above, the digital image processing apparatus 100 may allow the user to easily set a desired region as the AF region.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An electronic device comprising:
   an image receiving unit that obtains an image of a subject;
   a display unit; and
   a processing unit configured to:
   display an initial AF region on the display unit;
   adjust a focus corresponding to the subject at a current AF region upon receiving an auto-focus lock input;
   display the current AF region tracking the subject on the display unit while adjusting the focus corresponding to the subject; and
   if adjusting the focus to the subject is interrupted, change a position of the current AF region tracking the subject to the initial AF region,
   wherein the current AF region and the initial AF region are distinguishably displayed by showing at least one variation of a color, a shape, and thickness of a boundary line.

2. The apparatus of claim 1, wherein the current AF region tracking the subject is displayed as superimposed on the subject on the display unit.

3. The apparatus of claim 1, wherein before the current AF region tracks the subject, the subject is focused within the initial AF region of the display unit.

4. The apparatus of claim 1, wherein while the current AF region tracking the subject is displayed on the display unit, the processing unit is configured to display the initial AF region on the display unit.

5. The apparatus of claim 4, wherein the processing unit is further configured to display the current AF region in a different manner from the initial AF region on the display unit.

6. The apparatus of claim 1, wherein the processing unit generates and stores an image file upon receiving a shutter-release signal which occurs after receiving the auto-focus lock input.

7. A method of controlling an electronic device comprising a display unit, the method comprising:
   obtaining an image of a subject through an image receiving unit of the electronic device;
   displaying an initial AF region on the display unit;
   receiving an auto-focus lock signal;
   adjusting a focus corresponding to the subject at a current AF region upon receiving the auto-focus lock input;
   displaying the current AF region tracking the subject on the display unit while adjusting the focus corresponding to the subject; and
   if adjusting the focus to the subject is interrupted, changing a position of the current AF region tracking the subject to the initial AF region,
   wherein the current AF region and the initial AF region are distinguishably displayed by showing at least one variation of a color, a shape, and thickness of a boundary line.

8. The method of claim 7, wherein the current AF region tracks the subject during receiving the auto-focus lock signal, and during the tracking of the subject by the current AF region, the initial AF region also remains displayed on the display unit.

9. The method of claim 7, wherein the current AF region tracking the subject and the initial AF region are distinguishably displayed on the display unit.

10. The method of claim 7, wherein the current AF region tracking the subject comprises displaying a moving path of the current AF region tracking the subject on the display unit in real-time.

11. The method of claim 7, further comprising generating and storing an image file after receiving a capturing signal which occurs after receiving the auto-focus lock input.

12. A method of controlling an electronic device comprising a display unit, the method comprising:
- obtaining an image of a subject through an image receiving unit of the electronic device;
- displaying an initial AF region on the display unit;
- adjusting a focus corresponding to the subject at a current AF region;
- displaying the current AF region tracking the subject on the display unit while adjusting the focus corresponding to the subject; and
- if adjusting the focus to the subject is interrupted, changing a position of the current AF region tracking the subject to the initial AF region;
- wherein the current AF region and the initial AF region are distinguishably displayed by showing at least one variation of a color, a shape, and thickness of a boundary line.

13. An electronic device comprising:
a lens;
an image receiving unit that obtains an image of a subject;
a display unit; and
a processing unit configured to:
- display an initial AF region indicator at an initial position on the display unit;
- display a current AF region indicator tracking the subject on the display unit while focusing the lens on the subject; and
- if focusing the lens on the subject is interrupted, display the initial AF region indicator at the initial position on the display unit,
- wherein the initial AF region indicator and the current AF region indicator are distinguishably displayed by showing at least one variation of a color, a shape, and thickness.

14. An electronic device comprising:
a lens;
an image receiving unit that obtains an image of a subject;
a display unit; and
a processing unit configured to:
- display an initial AF region indicator at an initial position on the display unit;
- display a current AF region indicator tracking the subject on the display unit while focusing the lens on the subject; and
- if focusing the lens on the subject is interrupted, change a position of the current AF region indicator to the initial position and display the initial AF region indicator,
- wherein the initial AF region indicator and the current AF region indicator are distinguishably displayed by showing at least one variation of a color, a shape, and thickness.

15. The apparatus of claim 14, wherein the focusing the lens on the subject being interrupted comprises a first shutter release input being interrupted.

* * * * *